United States Patent
Kook et al.

(10) Patent No.: US 10,047,834 B2
(45) Date of Patent: Aug. 14, 2018

(54) PLANETARY GEAR TRAIN OF AUTOMATIC TRANSMISSION FOR VEHICLES

(71) Applicants: Jae Chang Kook, Hwaseong-si (KR); Seongwook Ji, Ansan-si (KR); Woochurl Son, Seongnam-si (KR); Hyun Sik Kwon, Seoul (KR); Woo Jin Chang, Suwon-si (KR); Seong Wook Hwang, Gunpo-si (KR); Wonmin Cho, Hwaseong-si (KR)

(72) Inventors: Jae Chang Kook, Hwaseong-si (KR); Seongwook Ji, Ansan-si (KR); Woochurl Son, Seongnam-si (KR); Hyun Sik Kwon, Seoul (KR); Woo Jin Chang, Suwon-si (KR); Seong Wook Hwang, Gunpo-si (KR); Wonmin Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 244 days.

(21) Appl. No.: 15/190,457

(22) Filed: Jun. 23, 2016

(65) Prior Publication Data
US 2017/0159775 A1    Jun. 8, 2017

(30) Foreign Application Priority Data
Dec. 2, 2015    (KR) .................. 10-2015-0170972

(51) Int. Cl.
*F16H 3/66*    (2006.01)

(52) U.S. Cl.
CPC .............. *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 6,960,149 B2 * | 11/2005 | Ziemer | ..................... | F16H 3/66 475/276 |
| 7,887,453 B2 * | 2/2011 | Phillips | ..................... | F16H 3/66 475/275 |
| 8,444,524 B2 * | 5/2013 | Gumpoltsberger | ....... | F16H 3/66 475/276 |
| 8,512,197 B2 * | 8/2013 | Mellet | ...................... | F16H 3/66 475/276 |
| 9,109,668 B2 * | 8/2015 | Thomas | .................... | F16H 3/62 |
| 9,175,752 B2 * | 11/2015 | Beck | ...................... | F16H 3/666 |
| 9,182,014 B2 * | 11/2015 | Beck | ......................... | F16H 3/66 |

(Continued)

FOREIGN PATENT DOCUMENTS

| | | | | |
|---|---|---|---|---|
| DE | 102013205380 A1 * | 10/2014 | ............... | F16H 3/66 |
| JP | 2014/500461 A | 1/2014 | | |
| KR | 1020120132021 A | 12/2012 | | |

*Primary Examiner* — Dirk Wright
(74) *Attorney, Agent, or Firm* — Morgan, Lewis & Bockius LLP

(57) ABSTRACT

Nine or more forward speeds and at least one reverse speed is achieved by a planetary gear train of an automatic transmission for a vehicle including an input shaft, an output shaft, four planetary gear sets respectively having three rotation elements, and six control elements for selectively interconnecting the rotation elements.

10 Claims, 2 Drawing Sheets

(56) References Cited

U.S. PATENT DOCUMENTS

| | | | |
|---|---|---|---|
| 9,285,016 B2* | 3/2016 | Beck | F16H 3/66 |
| 9,366,320 B2* | 6/2016 | Beck | F16H 3/66 |
| 9,458,910 B2 | 10/2016 | Beck et al. | |
| 9,476,482 B2* | 10/2016 | Beck | F16H 3/66 |
| 9,482,317 B2* | 11/2016 | Beck | F16H 3/66 |
| 9,482,318 B2* | 11/2016 | Beck | F16H 3/66 |
| 9,568,069 B2* | 2/2017 | Beck | F16H 3/66 |
| 9,845,847 B2* | 12/2017 | Kook | F16H 3/666 |
| 2015/0018162 A1 | 1/2015 | Beck et al. | |
| 2017/0268624 A1* | 9/2017 | Cho | F16H 3/66 |
| 2017/0268635 A1* | 9/2017 | Kook | F16H 3/666 |

* cited by examiner

FIG. 2

| Speed Stage | C1 | C2 | C3 | B1 | B2 | B3 | Gear Ratio |
|---|---|---|---|---|---|---|---|
| D1 |   | ● |   | ● |   | ● | 4.689 |
| D2 | ● |   |   | ● |   | ● | 2.952 |
| D3 | ● | ● |   |   |   | ● | 2.000 |
| D4 | ● |   | ● |   |   | ● | 1.400 |
| D5 | ● |   | ● |   |   |   | 1.000 |
| D6 |   | ● | ● | ● |   |   | 0.823 |
| D7 |   |   | ● | ● |   |   | 0.723 |
| D8 |   |   | ● | ● | ● |   | 0.600 |
| D9 |   | ● | ● |   | ● |   | 0.492 |
| REV |   | ● |   |   | ● | ● | -3.647 |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0170972 filed on Dec. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that improves power delivery performance and reduces fuel consumption by achieving nine forward speed stages using a minimum number of constituent elements.

Description of Related Art

In recent years, a rise in oil price caused unlimited competition for enhancing fuel efficiency.

As a result, researches into reduction of weight and enhancement of the fuel efficiency through down-sizing are being conducted in the case of an engine, and researches for simultaneously securing operability and fuel efficiency competitiveness through multistages are conducted in the case of an automatic transmission.

However, in the automatic transmission, as a number of transmission steps increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8-speed automated transmissions have tended to be achieved and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving nine forward speed stages and one reverse speed stage using a minimum number of constituent elements and of improving silent driving using a driving point positioned at a low engine speed.

A planetary gear train of an automatic transmission for a vehicle according to an exemplary embodiment of the present invention may include: an input shaft receiving torque of an engine; an output shaft outputting changed torque; a first planetary gear set including a first, second, and third rotation elements; a second planetary gear set including a fourth, fifth, and sixth rotation elements; a third planetary gear set including a seventh, eighth, and ninth rotation elements; a fourth planetary gear set including a tenth, eleventh and twelfth rotation elements; six friction elements disposed to selectively connect the rotation elements with the rotation element and selectively connect the rotation elements with a transmission housing; a first rotation shaft including the first rotation element and the fourth rotation element, and selectively connected to the transmission housing; a second rotation shaft including the second rotation element and the sixth rotation element, and selectively connectable to the input shaft and the transmission housing; a third rotation shaft including the third rotation element, and selectively connectable to the input shaft; a fourth rotation shaft including the fifth, seventh, and tenth rotation element; a fifth rotation shaft including the eighth rotation element and the twelfth rotation element, and directly connected to the output shaft; a sixth rotation shaft including the ninth rotation element, and selectively connectable to the transmission housing; and a seventh rotation shaft including the eleventh rotation element, and selectively connectable to the input shaft.

The first planetary gear set may be a single-pinion planetary gear set, in which the first rotation element is a first sun gear, the second rotation element is a first planet carrier, and the third rotation element is a first ring gear, and the second planetary gear set may be a single-pinion planetary gear set, in which the fourth rotation element is a second sun gear, the fifth rotation element is a second planet carrier, and the sixth rotation element is a second ring gear, and the third planetary gear set may be a double-pinion planetary gear set, in which the seventh rotation element is a third sun gear, the eighth rotation element is a third planet carrier, and the ninth rotation element is a third ring gear, and the fourth planetary gear set may be a single-pinion planetary gear set, in which the tenth rotation element is a fourth sun gear, the eleventh rotation element is a fourth planet carrier, and the twelfth rotation element is a fourth ring gear.

The six friction elements may include: a first clutch selectively connecting the input shaft and the second rotation shaft; a second clutch selectively connecting the input shaft the third rotation shaft; a third clutch selectively connecting the input shaft and the seventh rotation shaft; a first brake selectively connecting the first rotation shaft and the transmission housing; a second brake selectively connecting the second rotation shaft and the transmission housing; and a third brake selectively connecting the sixth rotation shaft and the transmission housing.

Shift speed stages are achieved by selectively operating the six friction elements, and may include: a first forward speed stage achieved by simultaneous operation of the second clutch and the first and third brakes; a second forward speed stage achieved by simultaneous operation of the first clutch and the first, and third brakes; a third forward speed stage achieved by simultaneous operation of the first; and second clutches and the third brake; a fourth forward speed stage achieved by simultaneous operation of the first, and third clutches and the third brake; a fifth forward speed stage achieved by simultaneous operation of the first, second and third clutches; a sixth forward speed stage achieved by simultaneous operation of the first, and third clutches and the first brake; a seventh forward speed stage achieved by simultaneous operation of the second, and third clutches and the first brake; an eighth forward speed stage achieved by simultaneous operation of the third clutch and the first, and second brakes; a ninth forward speed stage achieved by simultaneous operation of the second and third clutches and the second brake; and a reverse speed stage achieved by simultaneous operation of the second clutch and the second and third brakes.

An exemplary embodiment of the present invention may achieve nine forward speed stages and one reverse speed stage by combining four planetary gear sets which are formed as simple planetary gear sets, with six friction elements.

Also, silent drivability of vehicle may be improved greatly through the multistages of the automatic transmission appropriate to the engine rotation speed.

Further, engine driving efficiency may be maximized, and power delivery performance and fuel economy may be improved through the multistages of the automatic transmission appropriate to the engine rotation speed.

Further, the effects which may be obtained or predicted by the exemplary embodiment of the present invention will be directly or implicitly disclosed in the detailed description of the exemplary embodiments of the present invention. That is, various effects which are predicted by the exemplary embodiments of the present invention will be disclosed in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the planetary gear train according to an exemplary embodiment of the present invention.

Figure 1:
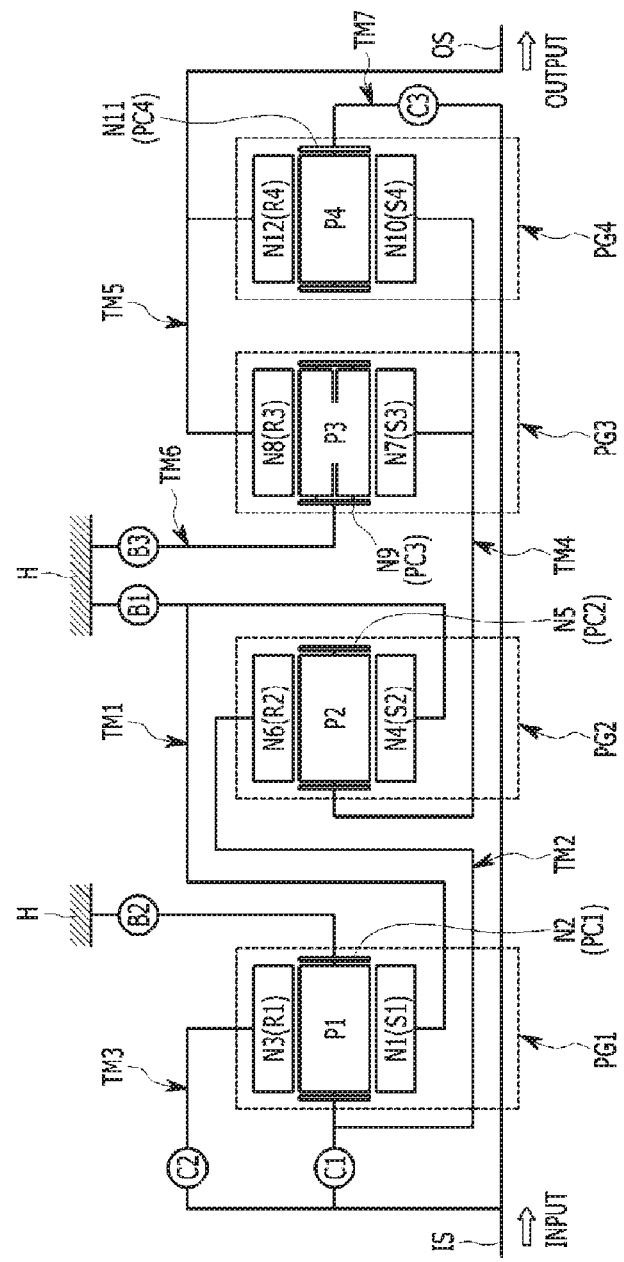
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

However, parts which are not related with the description are omitted for clearly describing the exemplary embodiment of the present invention, and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a planetary gear train according to a first exemplary embodiment of the present invention.

Referring to FIG. 1, the planetary gear train according to the exemplary embodiment of the present invention includes first, second, third, and fourth planetary gear sets PG1, PG2, PG3, and PG4 disposed on the same axis, and an input shaft IS, an output shaft OS, seven rotation shafts TM1 to TM7 composing respective rotation elements of the first, second, third and fourth planetary gear sets PG1, PG2, PG3, and PG4, 6 friction elements C1 to C3 and B1 to B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a double-pinion planetary gear set includes a third sun gear S3 which is a seventh rotation element N7, a third ring gear R3 which is an eighth rotation element N8 that internally engages with a third pinions P3 that externally engage with the third sun gear S3, and a third planet carrier PC3 which is a ninth rotation element N9 that supports the third pinions P3.

The fourth planetary gear set PG4 as a single-pinion planetary gear set includes a fourth sun gear S4 which is a tenth rotation element N10, a fourth planet carrier PG4 which is an eleventh rotation element N11 for supporting a fourth pinion P4 that externally engages with the fourth sun gear S4 that is the tenth rotation element N10, and a fourth ring gear R4 which is a twelfth rotation element N12 that internally engages with the fourth pinion P4.

In the first, second, third and fourth planetary gear sets PG1, PG2, PG3, and PG4, the first rotation element N1 is directly connected to the fourth rotation element N4, the second rotation element N2 is directly connected to the sixth rotation element N6, the fifth rotation element N5 is directly connected to the seventh rotation element N7 and the tenth rotation element N10, and the eighth rotation element N8 is directly connected to the twelfth rotation element N12 so as to be operated with a total of seven rotation shafts TM1 to TM7.

Configurations of the eight rotation shafts TM1 to TM7 will be described below.

The first rotation shaft TM1 includes the first rotation element N1 (the first sun gear S1) and the fourth rotation element N4 (the second sun gear S2), and is directly connected to the transmission housing H.

The second rotation shaft TM2 includes the second rotation element N2 (the first planet carrier PC1) and the sixth rotation element N6 (the second ring gear R2), and is selectively connectable to the input shaft IS and the transmission housing H.

The third rotation shaft TM3 includes the third rotation element N3 (the first ring gear R1), and is selectively connectable to the input shaft IS.

The fourth rotation shaft TM4 includes the fifth rotation element N5 (the second planet carrier PC2), the seventh rotation element N7 (the third sun gear S3), and the tenth rotation element N10 (the fourth sun gear S4).

The fifth rotation shaft TM5 includes the eighth rotation element N8 (the third ring gear R3) and the twelfth rotation element N12 (the fourth ring gear R4), and is directly connected to the output shaft OS.

The sixth rotation shaft TM6 includes the ninth rotation element N9 (the third planet carrier PC3), and is selectively connectable to the transmission housing H.

The seventh rotation shaft TM7 includes the eleventh rotation element N11 (the fourth planet carrier PC4), and is selectively connectable to the input shaft IS.

In addition, among the rotation shaft TM1 to TM7, three clutches C1, C2, and C3 which are friction elements are disposed at connection portions where the rotation shafts are connected to each other.

In addition, the rotation shafts TM1 to TM7, three brakes B1, B2, and B3 which are friction elements are disposed at connection portions between any one rotation shaft and the transmission housing H.

The six friction elements C1 to C3 and B1 to B3 will be described in further detail.

The first clutch C1 is disposed between the input shaft IS and the second rotation shaft TM2, and selectively connects the input shaft IS and the second rotation shaft TM2.

The second clutch C2 is disposed between the input shaft IS and the third rotation shaft TM3, and selectively connects the input shaft IS and the third rotation shaft TM3.

The third clutch C3 is disposed between the input shaft IS and the seventh rotation shaft TM7, and selectively connects the input shaft IS and the seventh rotation shaft TM7.

The first brake B1 is disposed between the first rotation shaft TM1 and the transmission housing H, and selective causes the first rotation shaft TM1 to be operated as a fixed element.

The second brake B2 is disposed between the second rotation shaft TM2 and the transmission housing H, and selective causes the second rotation shaft TM2 to be operated as a fixed element.

The third brake B3 is disposed between the sixth rotation shaft TM6 and the transmission housing H, and selective causes the sixth rotation shaft TM6 to be operated as a fixed element.

The friction elements including the first, second, and third clutches C1, C2, and C3, and the first, second, and third brakes B1, B2, and B3 may be multi-plate friction elements of a wet type that are operated by hydraulic pressure.

FIG. 2 is an operation chart of friction elements at each speed stage in the planetary gear train according to an exemplary embodiment of the present invention.

As shown in FIG. 2, three friction elements are operated at each speed stage in the planetary gear train according to an exemplary embodiment of the present invention. Shifting processes in the exemplary embodiment of the present invention will be described in further detail.

The second clutch C2 and the first and second brakes B1 and B2 are simultaneously operated at a first forward speed stage 1D. In a state that the input shaft IS is connected to the third rotation shaft TM3 by operation of the second clutch C2, and the input is made into the third, and fourth rotation shafts TM3 and TM4. And the first and sixth rotation shafts TM1 and TM6 are operated as a fixed element by operation of the first and third brakes B1 and B3, and the first forward speed stage 1D is achieved.

The first clutch C1 and the first and second brakes B1 and B2 are simultaneously operated at a second forward speed stage 2D. In a state that the input shaft IS is connected to the second rotation shaft TM2 by operation of the first clutch C1, and the input is made into the second and fourth rotation shafts TM2 and TM4. And the first and sixth rotation shafts TM1 and TM6 are operated as the fixed element by operation of the first and third brakes B1 and B3, and the second forward speed stage 2D is achieved.

The first and second clutches C1 and C2 and the third brakes B3 are simultaneously operated at a third forward speed stage 3D. In a state that the input shaft IS is connected to the second rotation shaft TM2 by operation of the first clutch C1, the input shaft IS is connected to the third rotation shaft TM3 by operation of the second clutch C2, and the input is made into the second, third, and fourth rotation shafts TM2, TM3, and TM4. And the sixth rotation shaft TM6 is operated as the fixed element by operation of the third brake B3, and the third forward speed stage 3D is achieved.

The first and third clutches C1 and C3 and the third brake B3 are simultaneously operated as a fourth forward speed stage D4. In a state that the input shaft IS is connected to the second rotation shaft TM2 by operation of the first clutch C1, the input shaft IS is connected to the seventh rotation shaft TM7 by operation of the third clutch C3, and the input is made into the second, fourth, and seventh rotation shafts TM2, TM4, and TM7. And the sixth rotation shaft TM6 is operated as the fixed element by operation of the third brake B3, and the fourth forward speed stage D4 is achieved.

The first, second, and third clutches C1. C2, and C3 are simultaneously operated as a fifth forward speed stage D5. In a state that the input shaft IS is connected to the second rotation shaft TM2 by operation of the first clutch C1, the input shaft IS is connected to the third rotation shaft TM3 by operation of the second clutch C2, the input shaft IS is connected to the seventh rotation shaft TM7 by operation of the third clutch C3, and the input is made into the second, third, fourth, and seventh rotation shafts TM2, TM3, TM4, TM7. Therefore, the fifth forward speed stage D5 for just outputting the input is achieved as all of the first, second, third, and fourth planetary gear sets PG1, PG2, PG3, and PG4 are integrally rotate at the same speed.

The first and third clutches C1 and C3 and the first brake B1 are simultaneously operated at a sixth forward speed stage D6. In a state that the input shaft IS is connected to the second rotation shaft TM2 by operation of the first clutch C1, the input shaft IS is connected to the seventh rotation shaft TM7 by operation of the third clutch C3, and the input is made into the second, fourth, and seventh rotation shafts TM2, TM4, and TM7. And the first rotation shaft TM1 is operated as the fixed element by operation of the first brake B1, and the sixth forward speed stage D6 is achieved.

The second and third clutch C2 and C3 and the first brake B1 are simultaneously operated as a seventh forward speed stage D7. In a state that the input shaft IS is connected to the third rotation shaft TM3 by operation of the second clutch C2, the input shaft IS is connected to the seventh rotation shaft TM7 by operation of the third clutch C3, and the input is made into the third, fourth, and seventh rotation shafts TM3, TM4, and TM7. And the first rotation shaft TM1 is operated as the fixed element by operation of the first brake B1, and the seventh forward speed stage D7 is achieved.

The third clutch C3 and the first and second brakes B1 and B2 are simultaneously operated as a eighth forward speed stage D8. In a state that the input shaft IS is connected to the seventh rotation shaft TM7 by operation of the third clutch C3, and the input is made into the fourth and seventh rotation shafts TM4 and TM7, And the first and second rotation shaft TM1 and TM2 are operated as the fixed element by operation of the first and second brakes B1 and B2, and the eighth forward speed stage D8 is achieved.

The second and third clutch C2 and C3 and the second brake B2 are simultaneously operated at a ninth forward speed stage D9. In a state that the input shaft IS is connected to the third rotation shaft TM3 by operation of the second clutch C2, the input shaft IS is connected to the seventh rotation shaft TM7 by operation of the second clutch C2, and the input is made into the third, fourth, and seventh rotation shafts TM3, TM4, and TM7. And the second rotation shaft TM2 is operated as the fixed element by operation of the second brake B2, and the ninth forward speed stage D9 is achieved.

The second clutch C2 and the second and third brakes B2 and B3 are simultaneously operated as a reverse speed stage REV. In a state that the input shaft IS is connected to the third rotation shaft TM3 by operation of the second clutch C2, and the input is made into the third and fourth rotation shafts TM3 and TM4. And the second and sixth rotation shaft TM2 and TM6 are operated as the fixed element by operation of the second and third brakes B2 and B3, and the reverse speed stage REV is achieved.

The planetary gear train according to an exemplary embodiment of the present invention may achieve nine forward speed stages and one reverse speed stage by control of four planetary gear sets PG1, PG2, PG3, and PG4, three clutches C1, C2, and C3, and three brakes B1, B2, and B3.

Also, silent drivability of vehicle may be improved greatly through the multistages of the automatic transmission appropriate to the engine rotation speed.

Further, engine driving efficiency may be maximized, and power delivery performance and fuel economy may be improved through the multistages of the automatic transmission appropriate to the engine rotation speed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft configured for receiving torque of an engine;
    an output shaft configured for outputting changed torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    six friction elements disposed to selectively connect the first, second, third, fourth, fifth, sixth, seventh, eighth, ninth, tenth, eleventh, and twelfth rotation elements with the first, second, third, fourth, fifth, sixth, seventh, eighth, ninth, tenth, eleventh, and twelfth rotation element and selectively connect the first, second, third, fourth, fifth, sixth, seventh, eighth, ninth, tenth, eleventh, and twelfth rotation elements with a transmission housing;
    a first rotation shaft including the first rotation element and the fourth rotation element, and selectively connected to the transmission housing;
    a second rotation shaft including the second rotation element and the sixth rotation element, and selectively connectable to the input shaft and the transmission housing;
    a third rotation shaft including the third rotation element, and selectively connectable to the input shaft;
    a fourth rotation shaft including the fifth, seventh, and tenth rotation elements;
    a fifth rotation shaft including the eighth rotation element and the twelfth rotation element, and directly connected to the output shaft;
    a sixth rotation shaft including the ninth rotation element, and selectively connectable to the transmission housing; and
    a seventh rotation shaft including the eleventh rotation element, and selectively connectable to the input shaft.

2. The planetary gear train of claim 1, wherein
    the first planetary gear set is a single-pinion planetary gear set, in which the first rotation element is a first sun gear, the second rotation element is a first planet carrier, and the third rotation element is a first ring gear, the second planetary gear set is a single-pinion planetary gear set, in which the fourth rotation element is a second sun gear, the fifth rotation element is a second planet carrier, and the sixth rotation element is a second ring gear, the third planetary gear set is a double-pinion planetary gear set, in which the seventh rotation element is a third sun gear, the eighth rotation element is a third planet carrier, and the ninth rotation element is a third ring gear, and the fourth planetary gear set is a single-pinion planetary gear set, in which the tenth rotation element is a fourth sun gear, the eleventh rotation element is a fourth planet carrier, and the twelfth rotation element is a fourth ring gear.

3. The planetary gear train of claim 1, wherein the six friction elements comprise:

a first clutch selectively connecting the input shaft and the second rotation shaft;

a second clutch selectively connecting the input shaft the third rotation shaft;

a third clutch selectively connecting the input shaft and the seventh rotation shaft;

a first brake selectively connecting the first rotation shaft and the transmission housing;

a second brake selectively connecting the second rotation shaft and the transmission housing; and a third brake selectively connecting the sixth rotation shaft and the transmission housing.

4. The planetary gear train of claim 3, wherein shift speed stages are achieved by selectively operating the six friction elements, and comprise:

a first forward speed stage achieved by simultaneous operation of the second clutch and the first and third brakes;

a second forward speed stage achieved by simultaneous operation of the first clutch and the first, and third brakes;

a third forward speed stage achieved by simultaneous operation of the first, and second clutches and the third brake;

a fourth forward speed stage achieved by simultaneous operation of the first, and third clutches and the third brake;

a fifth forward speed stage achieved by simultaneous operation of the first, second and third clutches;

a sixth forward speed stage achieved by simultaneous operation of the first, and third clutches and the first brake;

a seventh forward speed stage achieved by simultaneous operation of the second, and third clutches and the first brake;

an eighth forward speed stage achieved by simultaneous operation of the third clutch and the first, and second brakes;

a ninth forward speed stage achieved by simultaneous operation of the second and third clutches and the second brake; and a reverse speed stage achieved by simultaneous operation of the second clutch and the second and third brakes.

5. A planetary gear train of an automatic transmission for a vehicle, comprising:

an input shaft configured for receiving torque of an engine;

an output shaft configured for outputting changed torque;

a first planetary gear set is a single-pinion planetary gear set, and including a first rotation element, a second rotation element, and a third rotation element;

a second planetary gear set is a single-pinion planetary gear set, and including fourth, fifth and sixth rotation elements;

a third planetary gear set is a double-pinion planetary gear set, and including seventh, eighth and ninth rotation elements;

a fourth planetary gear set is a single-pinion planetary gear set, and including tenth, eleventh and twelfth rotation elements;

a first rotation shaft including the first and fourth rotation elements, and selectively connected to the transmission housing;

a second rotation shaft including the second and sixth rotation elements, and selectively connectable to the input shaft and the transmission housing;

a third rotation shaft including the third rotation element, and selectively connectable to the input shaft;

a fourth rotation shaft including the fifth, seventh, and tenth rotation elements;

a fifth rotation shaft including the eighth and twelfth rotation elements, and directly connected to the output shaft;

a sixth rotation shaft including the ninth rotation element, and selectively connectable to the transmission housing;

a seventh rotation shaft including the eleventh rotation element, and selectively connectable to the input shaft;

a first clutch selectively connecting the input shaft and the second rotation shaft;

a second clutch selectively connecting the input shaft and the third rotation shaft;

a third clutch selectively connecting the input shaft and the seventh rotation shaft;

a first brake selectively connecting the first rotation shaft and the transmission housing;

a second brake selectively connecting the second rotation shaft and the transmission housing; and a third brake selectively connecting the sixth rotation shaft and the transmission housing.

6. The planetary gear train of claim 5, wherein the first planetary gear set in which the first rotation element is a first sun gear, the second rotation element is a first planet carrier, and the third rotation element is a first ring gear, the second planetary gear set in which the fourth rotation element is a second sun gear, the fifth rotation element is a second planet carrier, and the sixth rotation element is a second ring gear, the third planetary gear set in which the seventh rotation element is a third sun gear, the eighth rotation element is a third planet carrier, and the ninth rotation element is a third ring gear, and the fourth planetary gear set in which the tenth rotation element is a fourth sun gear, the eleventh rotation element is a fourth planet carrier, and the twelfth rotation element is a fourth ring gear.

7. The planetary gear train of claim 5, wherein shift speed stages are achieved by selectively operating the three clutches and the three brakes, and comprise:

a first forward speed stage achieved by simultaneous operation of the second clutch and the first and third brakes;

a second forward speed stage achieved by simultaneous operation of the first clutch and the first, and third brakes;

a third forward speed stage achieved by simultaneous operation of the first, and second clutches and the third brake;

a fourth forward speed stage achieved by simultaneous operation of the first, and third clutches and the third brake;

a fifth forward speed stage achieved by simultaneous operation of the first, second and third clutches;

a sixth forward speed stage achieved by simultaneous operation of the first, and third clutches and the first brake;

a seventh forward speed stage achieved by simultaneous operation of the second, and third clutches and the first brake;

an eighth forward speed stage achieved by simultaneous operation of the third clutch and the first, and second brakes;

a ninth forward speed stage achieved by simultaneous operation of the second and third clutches and the second brake; and a reverse speed stage achieved by simultaneous operation of the second clutch and the second and third brakes.

8. A planetary gear train of an automatic transmission for a vehicle, comprising:

an input shaft configured for receiving torque of an engine;

an output shaft configured for outputting changed torque;

a first planetary gear set is a single-pinion planetary gear set, and including first three rotation elements having a first sun gear, a first planet carrier, and a first ring gear;

a second planetary gear set is a single-pinion planetary gear set, and including second three rotation elements having a second sun gear, a second planet carrier, and a second ring gear;

a third planetary gear set is a double-pinion planetary gear set, and including third three rotation elements having a third sun gear, a third planet carrier, and a third ring gear; and a fourth planetary gear set is a single-pinion planetary gear set, and including fourth three rotation elements having a fourth sun gear, a fourth planet carrier, and a fourth ring gear;

a first rotation shaft including the first sun gear and the second sun gear, and selectively connected to a transmission housing;

a second rotation shaft including the first planet earlier and the second ring gear, and selectively connectable to the input shaft and the transmission housing;

a third rotation shaft including the first ring gear, and selectively connectable to the input shaft;

a fourth rotation shaft including the second planet carrier and the third sun gear, and the fourth sun gear;

a fifth rotation shaft including the third ring gear and the fourth ring gear, and directly connected to the output shaft;

a sixth rotation shaft including the third planet carrier, and selectively connectable to the transmission housing;

a seventh rotation shaft, including the fourth planet carrier, selectively connectable to the input shaft; and six friction elements disposed to selectively connect the first, second, third and fourth three rotation elements with the first, second, third and fourth three rotation elements and selectively connect the first, second, third and fourth three rotation elements with the transmission housing.

9. The planetary gear train of claim 8, wherein the six friction elements comprise:

a first clutch selectively connecting the input shaft and the second rotation shaft;

a second clutch selectively connecting the input shaft the third rotation shaft;

a third clutch selectively connecting the input shaft and the seventh rotation shaft;

a first brake selectively connecting the first rotation shaft and the transmission housing;

a second brake selectively connecting the second rotation shaft and the transmission housing; and a third brake selectively connecting the sixth rotation shaft and the transmission housing.

10. The planetary gear train of claim 9, wherein shift speed stages are achieved by selectively operating the six friction elements, and comprise:

a first forward speed stage achieved by simultaneous operation of the second clutch and the first and third brakes;

a second forward speed stage achieved by simultaneous operation of the first clutch and the first, and third brakes;

a third forward speed stage achieved by simultaneous operation of the first, and second clutches and the third brake;

a fourth forward speed stage achieved by simultaneous operation of the first, and third clutches and the third brake;

a fifth forward speed stage achieved by simultaneous operation of the first, second and third clutches;

a sixth forward speed stage achieved by simultaneous operation of the first, and third clutches and the first brake;

a seventh forward speed stage achieved by simultaneous operation of the second, and third clutches and the first brake;

an eighth forward speed stage achieved by simultaneous operation of the third clutch and the first, and second brakes;

a ninth forward speed stage achieved by simultaneous operation of the second and third clutches and the second brake; and a reverse speed stage achieved by simultaneous operation of the second clutch and the second and third brakes.

* * * * *

UNITED STATES PATENT AND TRADEMARK OFFICE
CERTIFICATE OF CORRECTION

PATENT NO. : 10,047,834 B2
APPLICATION NO. : 15/190457
DATED : August 14, 2018
INVENTOR(S) : Jae Chang Kook et al.

Page 1 of 1

It is certified that error appears in the above-identified patent and that said Letters Patent is hereby corrected as shown below:

On the Title Page

Item (71) Applicant, please delete:
"Jae Chang Kook, Hwaseong-si (KR); Seongwook Ji, Ansan-si (KR); Woochurl Son, Seongnam-si (KR); Hyun Sik Kwon, Seoul (KR); Woo Jin Chang, Suwon-si (KR); Seong Wook Hwang, Gunpo-si (KR); Wonmin Cho, Hwaseong-si (KR)"

And insert therefor:
-- HYUNDAI MOTOR COMPANY, Seoul (KR) --.

Signed and Sealed this
Thirteenth Day of November, 2018

Andrei Iancu
*Director of the United States Patent and Trademark Office*